United States Patent
Kusumoto et al.

(10) Patent No.: US 6,600,529 B1
(45) Date of Patent: Jul. 29, 2003

(54) THIN POLARIZING PLATE AND LIQUID CRYSTAL DISPLAY USING THE SAME

(75) Inventors: Seiichi Kusumoto, Ibaraki (JP); Eiji Hamamoto, Ibaraki (JP); Youichirou Sugino, Ibaraki (JP); Hisashi Mihara, Ibaraki (JP); Senri Kondou, Ibaraki (JP); Kazuki Tsuchimoto, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 6 days.

(21) Appl. No.: 10/072,802

(22) Filed: Feb. 8, 2002

(51) Int. Cl.$^7$ .................. G02F 1/1335; G03B 21/14; G02B 1/10
(52) U.S. Cl. ................. 349/96; 353/20; 427/163.1
(58) Field of Search ................. 349/96; 353/20; 359/437.492; 264/78; 427/163.1; 428/522

(56) References Cited

U.S. PATENT DOCUMENTS 5,677,024 A * 10/1997 Abe et al. .................. 428/40.1
6,025,958 A * 2/2000 Yamaoka et al. ........... 359/494

FOREIGN PATENT DOCUMENTS

JP        2002-040256 A  *  2/2002

* cited by examiner

Primary Examiner—Tarifur R. Chowdhury
(74) Attorney, Agent, or Firm—Armstrong, Westerman & Hattori, LLP

(57) ABSTRACT

A thin polarizing plate is disclosed that includes a polarizer, a protective layer formed on at least one side of the polarizer, and a pressure sensitive adhesive layer formed on the protective layer, wherein the thickness A of the polarizer, the thickness B of the protective layer, the modulus of elasticity C of a pressure sensitive adhesive of the pressure sensitive adhesive layer, a numerical value 1 and a numerical value 2 satisfy the following relationships:

(numerical value 1)=B/A<2.0

(numerical value 2)=(numerical value 1)/C<20 thereby providing a thin and light-weighted polarizing plate. A thin and light weighted liquid crystal display using the described polarizing plate is also disclosed.

20 Claims, 1 Drawing Sheet

THIN POLARIZING PLATE AND LIQUID CRYSTAL DISPLAY USING THE SAME

BACKGROUND OF THE INVENTION

1. Field of the Invention

The present invention relates to a polarizing plate used for transmitting-type, reflecting-type and semitransparent reflecting-type liquid crystal displays (LCDs). In particular, the invention relates to (1) a polarizing plate used for a large liquid crystal display or a high contrast liquid crystal display, and (2) a polarizing plate used for a liquid crystal display in which a LCD module itself is thinned and lightened.

2. Description of the Prior Art

Recently, demand for LCDs used for, for example, personal computers has increased sharply. Application for LCDs has also broadened. Recently, such LCDs are used for monitoring as well.

A polarizing plate used for a LCD is manufactured, for example, by a method including steps of: dyeing a polyvinyl alcohol (PVA) film with dichroic iodine or a dichroic dyestuff; crosslinking the film with boric acid, borax, or the like; stretching the film uniaxially, followed by drying the film and sticking it to a protective layer such as a triacetylcellulose (TAC) film. The respective steps of dyeing, crosslinking and stretching are not necessarily carried out separately and can be carried out simultaneously. Furthermore, there is no limitation on the order of the steps.

In recent years, the size of LCDs has become larger, demands for high contrast have increased and higher quality polarizing plates have been required. Furthermore, both in small-size LCDs and large-size LCDs, thinning and lightening of the LCD itself are demanded. Recently, in particular, as liquid crystal displays have become larger and larger, the liquid crystal itself is becoming larger, while thinning and lightening of mobile displays are being advanced.

However, if the thickness of a polarizer, a protective layer and a pressure sensitive adhesive layer of the polarizing plate are simply reduced in order to meet the above-mentioned demands, such as thinning or lightening, when the polarizing plate is attached to a glass plate of a liquid crystal cell, there arise some problems in that the polarizing plate is peeled off from the glass plate or foams are generated or warping occurs in the glass plate.

SUMMARY OF THE INVENTION

In one aspect, the present invention relates to a thin polarizing plate and a thin and light liquid crystal display using a thin polarizing plate. By thinning the polarizing plate, the weight of the large-size liquid crystal display may be prevented from increasing due to the increase in size of the liquid crystal display and miniaturization and lightening of mobile liquid crystal displays is achieved.

In embodiments of the present invention, a thin polarizing plate includes a polarizer, a protective layer formed on at least one side of the polarizer, and a pressure sensitive adhesive layer formed on the protective layer, wherein the thickness A of the polarizer, the thickness B of the protective layer, and the modulus of elasticity C of a pressure sensitive adhesive in the pressure sensitive adhesive layer, numerical value 1 and numerical value 2 satisfy the following relationships:

(numerical value 1)=B/A<2.0

(numerical value 2)=(numerical value 1)/C<20.

In some embodiments of the present invention, it is preferable that the numeral value 2 is 12 or less.

In some embodiments of the present invention, a reflector or a transreflector may be attached to the polarizing plate.

In some embodiments of the present invention, a retardation plate or a λ plate may be attached to the polarizing plate.

In some embodiments of the present invention, a viewing angle compensating film may be attached to the polarizing plate.

In some embodiments of the present invention, a brightness-enhanced film may be attached to the polarizing plate.

In some embodiments of the present invention, the polarizing plate is subjected to an anti-glare treatment.

In some embodiments of the present invention, a liquid crystal display uses the polarizing plate in accordance with an embodiment described above on at least one side of a liquid crystal cell.

DESCRIPTION OF THE PREFERRED EMBODIMENT

Figure 1:
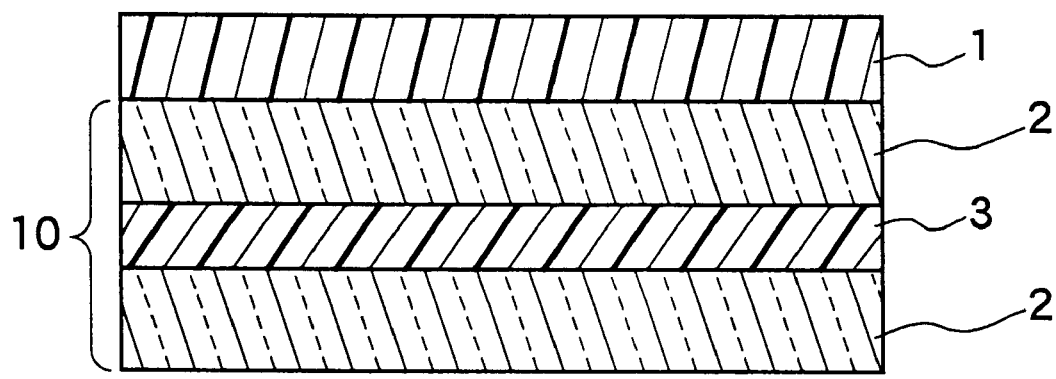
FIG. 1 is a cross-sectional view showing a polarizing plate according to one embodiment of the present invention.

In the present invention, by limiting the thickness of a polarizer, the thickness of a protective layer and the modulus elasticity of pressure sensitive adhesives to a certain range that satisfies a certain relationship, it is possible to obtain a thin polarizing plate without incurring problems when a polarizing plate is attached to a liquid crystal cell. It is also possible to provide a thinner and lighter liquid crystal display.

In a basic configuration of a polarizing plate in accordance with the present invention, a transparent protective film as a protective layer is adhered to one side or both sides of a polarizer, which may be made of a polyvinyl alcohol-based polarizing film containing dichroic substance, i.e., an absorptive polarizer, and the like. The protective layer is adhered to the polarizer via an appropriate adhesive layer, for example, a layer of adhesive made of a vinyl alcohol-based polymer.

A polarizer (polarizing film) made of an appropriate vinyl alcohol-polymer film that is known in the art, for example, polyvinyl alcohol film, a partially formalized polyvinyl alcohol film, or the like, is subjected to appropriate treatment such as dyeing with dichroic substances such as iodine and a dichroic dyestuff, stretching, and crosslinking into any suitable orders and manners. Any polarizer can be used, as long as it allows linearly polarized light to pass through the film when natural light enters. In particular, a polarizer with an excellent light transmittance and a polarization degree may be preferred.

As a material for the protective film forming a transparent protective layer provided on one surface or both surfaces of the polarizer (polarizing film), an appropriate transparent film can be used. As the polymer, for example, an acetate-based resin such as triacetylcellulose may be used. However, the polymer is not necessarily limited thereto.

When factors, such as polarizing property and durability are taken into consideration, a preferred transparent protective film may be a triacetylcellulose film having a surface saponified with alkali or the like. A transparent protective film provided on one surface of a polarizing film can be a film having surface polymers distinguished from the polymers provided on the other surface of the polarizing film.

In some embodiments, the transparent protective film used for the protective layer may be subject to treatment for providing properties such as hard coating, antireflection, anti-sticking, dispersion, or anti-glaring. Hard coating treatment may be carried out to prevent scratches on the surfaces of the polarizing plate by, for example, applying a surface of the transparent protective film with a coating film of a hardening resin (e.g., a silicon-based ultraviolet hardening resin) having excellent hardness and smoothness, etc.

Anti-reflection treatment may be carried out to prevent reflection of outdoor daylight on the surface of the polarizing plate by, for example, forming an anti-reflection film in a conventional manner. Anti-sticking treatment may be carried out to prevent adjacent layers from sticking to each other. Anti-glaring treatment may be carried out to prevent visibility of light passing through the polarizing plate from being hindered by outdoor daylight reflected on the surface of the polarizing plate. The anti-glaring treatment can be carried out by providing microscopic asperities on a surface of a transparent protective film in an appropriate manner, for example, by roughening the surface by sand-blasting or embossing, by blending transparent particles, or the like.

There is no specific limitation on the treatment for adhering the polarizer (polarizing film) to the transparent protective film that is a protective layer. Adhesion can be carried out, for example, by using an adhesive such as an adhesive including a vinyl alcohol-based polymer, or an adhesive including at least a water-soluble crosslinking agent of vinyl alcohol-based polymer such as boric acid, borax, glutaraldehyde, melamine and oxalic acid. A layer of such an adhesive can be formed by, for example, applying and drying an aqueous solution. In preparation of the aqueous solution, other additives, or a catalyst such as an acid can be blended if necessary.

A polarizer can be used as an optical member that is laminated onto another optical layer. Although there is no specific limitation on the optical layer, one or two or more of appropriate optical layer(s) applicable for formation of a liquid crystal display, etc. can be used. Examples of an optical layer include, for example, a reflector, a transreflector, a retardation plate (such as a $\lambda$ plate like a half wavelength plate and a quarter wavelength plate), a viewing angle compensating film, a brightness enhanced film, and the like. Examples of a polarizing plate include a reflective polarizing plate or a semitransparent polarizing plate formed by laminating a reflector or a transreflector on the above-mentioned polarizing plate including a polarizer and a protective layer according to the present invention; an elliptical polarizing plate or a circular polarizing plate formed by laminating a retardation plate on the above-mentioned polarizing plate including a polarizer and a protective layer; a polarizing plate formed by laminating a viewing angle compensating film on the above-mentioned polarizing plate including a polarizer and a protective layer; and a polarizing plate formed by laminating a brightness enhanced film on the above-mentioned polarizing plate including a polarizer and a protective layer.

A reflector may be provided on a polarizing plate to form a reflective polarizing plate. In general, such a reflective polarizing plate is provided on the backside of a liquid crystal cell in order to make a liquid crystal display, etc. to display by reflecting incident light from a visible side (display side). The reflective polarizing plate has some advantages, for example, light sources such as backlight need not be built in, and thus the liquid crystal display can be thinner.

A semitransparent polarizing plate can be obtained by using the method for forming the reflective polarizing plate described above, except that a semitransparent reflecting layer such as a half mirror, which reflects light and transmits light, is used instead of the reflecting layer. In general, the semitransparent polarizing plate may be provided on the backside of a liquid crystal cell. When a liquid crystal display is used in a relatively bright atmosphere, the semitransparent polarizing plate allows an incident light from the visible side (display side) to be reflected to display an image, while in a relatively dark atmosphere, an image is displayed by using a built-in light source such as a backlight beheind the semitransparent polarizing plate. In other words, the semitransparent polarizing plate is useful for forming a liquid crystal display that can save energy of using a light source such as a backlight under a bright atmosphere, and also can be used by using a built-in light source under a relatively dark atmosphere.

An elliptical polarizing plate or a circular polarizing plate in which a retardation plate is additionally laminated on the above-mentioned polarizing plate including a polarizer and a protective layer will now be explained.

A retardation plate is typically used for modifying linearly polarized light to either elliptical polarized light or circular polarized light, modifying elliptical polarized light or circular polarized light to linearly polarized light, or modifying a polarization direction of linearly polarized light. In particular, a retardation plate called a quarter wavelength plate ($\lambda/4$ plate) is generally used for modifying linearly polarized light to circular polarized light, and for modifying circular polarized light to linearly polarized light. A half wavelength plate ($\lambda/2$ plate) is generally used for modifying a polarization direction of linearly polarized light.

An elliptical polarizing plate can be effective in compensating (preventing) colors (blue or yellow) generated due to birefringence in a liquid crystal layer of a super twist nematic (STN) liquid crystal display so as to provide a black-and-white display free from the above-mentioned colors. Controlling three-dimensional refractive index may be further preferred since an elliptical polarizing plate can compensate (prevent) colors observed when looking a screen of the liquid crystal display from an oblique direction. A circular polarizing plate is effective, for example, in adjusting color tones of an image of a reflective liquid crystal display that has a color image display, and it also serves to prevent reflection as well.

A polarizing plate in which a viewing angle compensating film is laminated on the above-mentioned polarizing plate including a polarizer and a protective layer will now be explained.

The viewing angle compensating film is typically used for widening a viewing angle so that an image can be seen relatively clearly even when a screen of a liquid crystal display is viewed from a slightly oblique direction.

As the viewing angle compensating film, a triacetylcellulose film etc. coated with a discotic liquid crystal, or a retardation plate may be used. While an ordinary retardation plate is a birefringent polymer film that is stretched uniaxially in the face direction, a retardation plate used as the viewing angle compensating film is a two-way stretched film such as a birefringent polymer film stretched biaxially in the face direction, or an incline-oriented polymer film with a controlled refractive index in the thickness direction that is stretched uniaxially in the face direction and stretched also in the thickness direction. The incline-oriented film is prepared by, for example, bonding a heat shrinkable film to a polymer film and subjecting the polymer film to stretching treatment and/or shrinking treatment under the influence of a shrinkage force by heat, or by obliquely orienting a liquid crystal polymer. A polymer as a material of the retardation plate is similar to the polymer used for the above-mentioned retardation plate.

A polarizing plate in which a brightness enhanced film is attached to the above-mentioned polarizing plate including a polarizer and a protective layer is generally arranged on the backside of a liquid crystal cell. When natural light enters by the backlight of the liquid crystal display etc. and reflection from the backside and the like, the brightness enhanced film reflects linearly polarized light of a predetermined polarizing axis or circularly polarized light in a predetermined direction, while transmitting other light. The polarizing plate in which the brightness enhanced film is laminated on the above-mentioned polarizing plate including a polarizer and a protective layer allows entrance of light from a light source such as a backlight to obtain transmitted light in a predetermined polarization state, while reflecting light other than light in the predetermined polarization state. Light reflecting by the brightness enhanced film is reversed through a reflecting layer or the like arranged additionally behind the brightness enhanced film. The reversed light is allowed to re-enter the brightness enhanced plate. The re-entering light is transmitted partly or entirely as light in a predetermined polarization state so as to increase the amount of light passing through the brightness enhanced film and polarized light that is hardly absorbed in the polarizer is supplied so as to increase the amount of light available for the liquid crystal display, etc. Thus, the brightness can be enhanced.

Examples of a brightness enhanced film include, for example, a film which transmits a linearly polarized light having a predetermined polarization axis and reflects other light, for example, a multilayer thin film of a dielectric or a multilayer laminate of thin films with varied refraction aeolotropy; a film that reflects either clockwise or counter-clockwise circular polarized light while transmitting other light, for example, a cholesteric liquid crystal layer, more specifically, an oriented film of a cholesteric liquid crystal polymer or an oriented liquid crystal layer supported on a supportive substrate, or the like.

Therefore, with the brightness enhanced film transmitting a linearly polarized light having a predetermined polarization axis, the transmitted light directly enters the polarizing plate with the polarization axes matched, so that absorption loss due to the polarizing plate is controlled and the light can be transmitted efficiently. On the other hand, with the brightness enhanced film transmitting a circular polarized light, such as a cholesteric liquid crystal layer, preferably, the transmission circular polarized light is converted into linearly polarized light before entering the polarizing plate in an aspect of controlling of the absorption loss, although the circular polarized light can enter the polarizer directly. Circular polarized light can be converted into linearly polarized light by using a quarter wavelength plate as a retardation plate.

Furthermore, a polarizing plate can be formed by laminating a polarizing plate and two or at least three optical layers like the above-mentioned polarization separating type polarizing plate. Therefore, the polarizing plate can be a reflective elliptical polarizing plate, a semitransparent elliptical polarizing plate or the like, which is prepared by combining the above-mentioned reflective polarizing plate or a semitransparent polarizing plate with a retardation plate. An optical member including a lamination of two or at least three optical layers can be formed in a method of laminating layers separately in a certain order for manufacturing a liquid crystal display etc. or in a method for preliminary lamination. Because an optical member that has been laminated previously has excellent stability in quality and assembling operability, efficiency in manufacturing a liquid crystal display can be improved. Any appropriate adhesion means, such as a pressure sensitive adhesive layer, can be used for lamination.

The pressure sensitive adhesive layer can be provided on a polarizing plate or on an optical member for adhesion with other members such as a liquid crystal cell. The adhesive layer can be formed by the conventional appropriate pressure sensitive adhesives, such as an acrylic pressure sensitive adhesive. Pressure sensitive adhesives having a low moisture absorption coefficient and an excellent heat resistance may be preferred due to aspects of prevention of foaming or peeling caused by moisture absorption, prevention of decrease in the optical properties and warping of a liquid crystal cell caused by difference in thermal expansion coefficients, formation of a high quality liquid crystal display having excellent durability, etc. The pressure sensitive adhesive layer can contain fine particles to obtain optical diffusivity. Pressure sensitive adhesive layers can be provided on necessary surfaces if required. For example, the polarizing plate including a polarizer and a protective layer can be provided with a pressure sensitive adhesive layer on at least one surface of the protective layer as required.

When a pressure sensitive adhesive layer provided on the polarizing plate or the optical member is exposed on the surface, preferably, the pressure sensitive adhesive layer is temporarily covered with a separator for preventing contamination by the time the pressure sensitive adhesive layer is used. The separator can be made of an appropriate thin sheet by coating a peeling agent if required. Examples of the peeling agent include, for example, a silicone-based peeling agent, a long-chain alkyl-based peeling agent, a fluorine-based peeling agent, a peeling agent including molybdenum sulfide or the like.

The above-described members forming a polarizing plate and an optical member, such as a polarizing film, a transparent protective film, an optical layer, and a pressure sensitive adhesive layer can have ultraviolet absorption power by treating with an ultraviolet absorber such as, for example, an ester salicylate compound, a benzophenone compound, a benzotriazole compound, a cyanoacrylate compound, a nickel complex salt compound, or the like.

The above-mentioned polarizing plate can be used for formation of various apparatus such as a liquid crystal display. The liquid crystal display can be produced as conventionally known structures, such as transmission type, reflection type, or a transmission-reflection type. A liquid crystal cell forming the liquid crystal display can be selected arbitrarily from appropriate cells such as active matrix driving type represented by a thin film transistor, a simple matrix driving type represented by a twist nematic type and a super twist nematic type.

When polarizing plates or optical members are provided on both sides of a liquid crystal cell, the polarizing plates or the optical members on both sides can be the same or different. Moreover, for forming a liquid crystal display, one or at least two layers of appropriate members such as a prism array sheet, a lens array sheet, an optical diffuser, or a backlight can be arranged at appropriate positions.

Hereinafter, the present invention will be explained with reference to Examples and Comparative Examples.

Production of Polarizing Plate

As shown in FIG. 1, a polarizing plate 10 was prepared by attaching a TAC film as protective layers 2 having a thickness of 40 μm as a protective layer onto the both sides of a polarizer 3 made of PVA which contains iodine, has a single substance transmittance of 43.0%, polarization degree of 99.9% and thickness of 30 μm. This polarizing plate is referred to as a polarizing plate (1). Apolarizing plate (2) was prepared in the same manner as in the polarizing plate (1) except that a TAC film having a thickness of 50 μm was used as protective layers 2. Furthermore, a polarizing plate (3) was prepared in the same manner as in the polarizing plate (1) except that a TAC film having a thickness of 60 μm was used as protective layers 2. With respect to the produced polarizing plates (1) to (3), each numerical value 1 was calculated from the equation: (numerical value 1) =thickness B of protective film/thickness A of polarizer. The results are shown in Table 1.

TABLE 1

(numerical value 1)

| sample | thickness A of polarizer | thickness B of protective layer | thickness B of protective layer/ thickness A of polarizer |
|---|---|---|---|
| (1) | 30 μm | 40 μm | 1.3 |
| (2) | 30 μm | 50 μm | 1.7 |
| (3) | 30 μm | 60 μm | 2.0 |

Next, acrylic resin-based pressure sensitive adhesives a, b and c having the modulus of elasticity shown in Table 2 were coated on one surface of the polarizing plates (1) to (3), to thus form a pressure sensitive adhesive layer 1. With respect to the polarizing plates (1) to (3) in which each pressure sensitive adhesive layer was formed, each numerical value 2 was calculated from the equation: (numerical value 2)= (numerical value 1)/modulus of elasticity C of pressure sensitive adhesive was calculated. The results are shown in Table 3.

TABLE 2

| kinds of pressure sensitive adhesives | modulus of elasticity (MPa) |
|---|---|
| a | 0.16 |
| b | 0.11 |
| c | 0.06 |

TABLE 3

(numerical value 2)

kinds of pressure sensitive adhesives

| sample | a | b | c |
|---|---|---|---|
| (1) | 8 (Example) | 12 (Example) | 22 (Comparative Example) |
| (2) | 11 (Example) | 15 (Example) | 28 (Comparative Example) |
| (3) | 13 (Example) | 18 (Example) | 33 (Comparative Example) |

Evaluation of Each Polarizing Plate

Each polarizing plate produced as mentioned above was formed into a 38 cm diagonal screen at an absorption axis angle of 45° seen from the pressure sensitive adhesive layer and attached to the both sides of a 0.7 mm-thick glass plate so that the polarization directions are perpendicular to each other. Thus, samples corresponding to Table 3 were produced. Thereafter, the samples were subjected to an autoclave treatment at 50° C. at 0.5 MPa for 30 minutes.

Furthermore, these samples were heated in an oven at 80° C. for 240 hours, and then naturally cooled, followed by visual observation of the samples with respect to peeling of each sample from the glass plate, foaming, warping in the glass plate. The results are shown in Table 4. In the evaluation in Table 4, the sample in which no peeling, foaming and warping occurred is denoted by ⊙; the sample in which any one of peeling, foaming and warping occurred is denoted by ○; and the sample in which two or more of peeling, foaming, and warping occurred and there were a problem from the viewpoint of practical use denoted by X.

TABLE 4 kinds of pressure sensitive adhesives

| sample | a | b | c |
|---|---|---|---|
| (1) | ⊙ | ⊙ | X |
| (2) | ⊙ | ○ | X |
| (3) | ○ | ○ | X |

As is apparent from Table 4, in the samples having the numerical value 2 from 13 to 18, no practical problems occurred. Furthermore, in the samples having the numerical value 2 of 12 or less, no problems occurred. In the samples having the numerical value 2 of 22 or more, problems that are not suitable for practical use occurred. The problems increased as the numerical value 2 increased.

As mentioned above, the numerical value 2 is suitably for a value of 20 or less, and more preferably 12 or less.

As mentioned above, according to the present invention, a protective layer is provided on at least one side of the polaiizer and on the protective layer, a pressure sensitive adhesive layer is provided. When a certain relationship is established in the thickness A of the polarizer, the thickness B of the protective layer and the modulus elasticity of the pressure sensitive adhesive of the pressure sensitive adhesive layer, a thin polarizing plate and a liquid crystal display using the same can be provided. Advantageously, a thin polarizing plate and a liquid crystal display in accordance with the present invention may provide an excellent industrial value.

The invention may be embodied in other forms without departing from the spirit or essential characteristics thereof. The embodiments disclosed in this application are to be considered in all respects as illustrative and not limitative. The scope of the invention is indicated by the appended claims rather than by the foregoing description, and all changes which come within the meaning and range of equivalency of the claims are intended to be embraced therein.

What is claimed is:

1. A thin polarizing plate comprising:

a polarizer;

a protective layer formed on at least one side of the polarizer; and a pressure sensitive adhesive layer formed on the protective layer, wherein a thickness A of the polarizer, a thickness B of the protective layer, a modulus of elasticity C of a pressure sensitive adhesive in the pressure sensitive adhesive layer, a numerical value 1, and a numerical value 2 satisfy the following relationships:

(numerical value 1)=B/A<2.0

(numerical value 2)=(numerical value 1)/C<20.

2. The thin polarizing plate according to claim 1, wherein the numerical value 2 is 12 or less.

3. The thin polarizing plate according to claim 1, further comprising at least one selected from the group of a reflector and a transreflector attached to the polarizing plate.

4. The thin polarizing plate according to claim 1, further comprising at least one selected from the group of a retardation plate and a λ plate attached to the polarizing plate.

5. The thin polarizing plate according to claim 1, further comprising a viewing angle compensating film attached to the polarizing plate.

6. The thin polarizing plate according to claim 1, further comprising a brightness enhancement file attached to the polarizing plate.

7. The thin polarizing plate according to claim 1, wherein the polarizing plate is subjected to an anti-glare treatment.

8. The polarizing plate according to claim 1, wherein the polarizer is a vinyl alcohol polymer film.

9. The polarizing plate according to claim 1, wherein the polarizer is a dichroic polarizer.

10. The polarizing plate according to claim 1, wherein the polarizer is an absorptive polarizer.

11. A liquid crystal display comprising: a liquid crystal cell; and a thin polarizing plate disposed on at least one side of the liquid crystal cell, the thin polarizing plate comprising a polarizer, a protective layer formed on at least one side of the polarizer, and a pressure sensitive adhesive layer formed on the protective layer, wherein a thickness A of the polarizer, a thickness B of the protective layer, a modulus of elasticity C of a pressure sensitive adhesive in the pressure sensitive adhesive layer, a numerical value 1, and a numerical value 2 satisfy the following relationships:

(numerical value 1)=B/A<2.0

(numerical value 2)=(numerical value 1)/C<20.

12. The liquid crystal display according to claim 11, wherein the numerical value 2 is 12 or less.

13. The liquid crystal display according to claim 11, wherein at least one of a reflector and a transreflector is attached to the polarizing plate.

14. The liquid crystal display according to claim 11, wherein at least one of a retardation plate and a λ plate is attached to the polarizing plate.

15. The liquid crystal display according to claim 11, wherein a viewing angle compensating film is attached to the polarizing plate.

16. The liquid crystal display according to claim 11, wherein a brightness enhancement film is attached to the polarizing plate.

17. The liquid crystal display according to claim 11, wherein the polarizing plate is subjected to an anti-glare treatment.

18. The liquid crystal display according to claim 11, wherein the polarizer is a vinyl alcohol polymer film.

19. The liquid crystal display according to claim 11, wherein the polarizer is a dichroic polarizer.

20. The liquid crystal display according to claim 11, wherein the polarizer is an absorptive polarizer.

* * * * *